United States Patent [19]

Alexander et al.

[11] 4,367,882

[45] Jan. 11, 1983

[54] SUSPENSION APPARATUS

[75] Inventors: Graham H. Alexander, Upper Arlington; David C. Doerschuk, Grove City, both of Ohio

[73] Assignee: Battelle Memorial Institute, Columbus, Ohio

[21] Appl. No.: 139,361

[22] Filed: Apr. 11, 1980

[51] Int. Cl.³ ............................................. B62K 25/08
[52] U.S. Cl. .................................. 280/276; 188/272; 280/703
[58] Field of Search ...................... 280/276, 277, 703; 188/272; 267/65 D

[56] References Cited

U.S. PATENT DOCUMENTS

| | | | |
|---|---|---|---|
| 2,131,014 | 9/1938 | Sanford | 280/703 |
| 3,989,261 | 11/1976 | Kawaguchi | 280/276 |
| 4,159,123 | 6/1976 | Petty | 280/276 |
| 4,186,936 | 2/1980 | Offenstadt | 280/277 |
| 4,295,658 | 10/1981 | Koshimo | 280/276 |

FOREIGN PATENT DOCUMENTS 55-36178  3/1980  Japan .................................. 280/703

*Primary Examiner*—Joseph F. Peters, Jr.
*Assistant Examiner*—Ross Weaver
*Attorney, Agent, or Firm*—Philip M. Dunson

[57] ABSTRACT

Suspension apparatus (10) for the front end of a motorcycle, bicycle, or like vehicle (11), having a brake (12) on the front wheel (13), comprising a suspension device (14) comprising a pair of telescopic members (27,28) connected to permit relative movement between the frame (15) of the vehicle (11) and the axle (16) of the front wheel (13), a linkage (17,18,20) and a hydraulic cylinder (19) for converting friction force (at 17) from any substantial braking (at 12) of the front wheel (13) into an approximately proportional hydraulic force (at 21), and fluid connecting lines (22,24) with adjustable damping means (23) for applying the hydraulic force (from the fluid 21) to the suspension device (14), at an end surface (29) of a piston (35), so as to oppose and at least largely counterbalance the inertial force thereto resulting from the braking action, and thus to at least largely eliminate diving by the front end of the vehicle (11) when the brake (12) is applied.

12 Claims, 4 Drawing Figures

SUSPENSION APPARATUS

FIELD

This invention relates to suspension apparatus for the front end of a motorcycle, bicycle, or like vehicle, having a brake on the front wheel. It is especially advantageous for counteracting the tendency of the front end to dive when the brake is applied. The improved antidiving and other smoothing actions provided by the present invention substantially increase the safety and comfort of the rider of the vehicle during and immediately after braking, especially when the brake must be applied suddenly and forcefully.

BACKGROUND

The front wheel of a motorcycle typically is mounted rotatably on an axle or spindle spanning the free ends of two parallel legs of a front fork which is pivotably connected to a main frame of the motorcycle for steering movement of the front wheel. The front fork usually incorporates a pair of telescopic shock absorbers, one for each leg of the fork. The shock absorbers may contain both compression springs and hydraulic fluid to absorb the jolts and shocks caused by bumps and other irregularities of the surfaces traveled by the motorcycle. For a front end in which the wheel including its hub rotates around the axle as the motorcycle travels, a conventional braking system may comprise a friction producing means which for braking purposes arrests rotational movement of the front wheel through a fixed braking member being brought into contact with an adjacent braked member mounted on the hub of the rotating wheel. For instance, the braking member may comprise brake shoes carried by a plate, or brake pads carried by an actuating caliper, with the plate or caliper being secured to a fork leg or to a non-rotatable axle fixedly connected with the fork legs. The actuation of a braking member's shoes or pads into a friction contact with a rotating braked member may be accomplished by mechanical lever movement or by movement of pistons of hydraulic brake cylinders which are controlled by the motorcycle operator through such means as hand brake levers. As is known for a motorcycle incorporating this form of front wheel suspension and braking, the telescopic shock absorbers undergo compression upon braking, with the motorcycle's front end dipping or diving, and diving quite severely upon hard braking. This front end diving upon braking can be hazardous, with a resultant loss of operator handling stability and control of the motorcycle.

The art has recognized some of the dangers arising from a motorcycle's front end diving upon braking, and a variety of approaches and means have been tried for alleviating this dive problem. U.S. Pat. No. 3,989,261, Kawaguchi, discloses a motorcycle front-wheel suspension with means for restraint of compression of a telescopic front end upon braking. In one embodiment a torque force from braking is utilized, as through a leverage mechanism, to lock the telescopic shock absorbers of the front fork against compression. In another, a leverage mechanism closes a valve to shut off hydraulic fluid flow between chambers of the telescopic front fork. U.S. Pat. No. 3,899,049, Martin, while principally concerned with motorcycle brakes, in its FIG. 4 refers to a torque take-up arm of use with a motorcycle rear wheel, but which would not be useful for the front wheel.

The present invention is not limited to an off or on type of control as in the Kawaguchi suspensions, but provides a smoothly increasing force to oppose the diving action that ordinarily accompanies braking. It also provides a gradually decreasing force as the brake is released, and thus avoids any noticeable overshoot or upsurging by the front end. Other features of the invention, such as its adjustable damping, also add to the safety and comfort of the person operating the vehicle and of any other occupant.

DISCLOSURE

Typical suspension apparatus according to the present invention, for the front end of a motorcycle, bicycle, or like vehicle, having a brake on the front wheel, comprises a suspension device connected to permit relative movement between the frame of the vehicle and the axle of the front wheel, means for converting friction force from any substantial braking of the front wheel into an approximately proprotional hydraulic force, and means for applying the hydraulic force to the suspension device so as to oppose and at least largely counterbalance the inertial force thereto resulting from the braking action, and thus to at least largely eliminate diving by the front end of the vehicle when the brake is applied.

The hydraulic force applying means typically includes damping means for allowing the hydraulic force to increase gradually, when the brake is applied, to the force that at least largely counterbalances the inertial force (weight transfer) to the suspension device; and the damping means typically includes means for adjusting the rate of increase in the hydraulic force that is applied to the suspension device. Typically the hydraulic force applying means includes also damping means for allowing the hydraulic force to decrease gradually, when the inertial force on the suspension device decreases, to a lower force to at least largely eliminate upsurging by the front end of the vehicle, and such damping means typically includes means for adjusting the rate of decrease in the hydraulic force that is applied to the suspension device.

The suspension device typically comprises a pair of telescopic members that are movable inward toward each other against a resisting force and outward away from each other against a resisting force, and the hydraulic force applying means typically comprises means for transmitting the hydraulic force to the telescopic members so as to oppose any inward movement thereof. The first mentioned resisting force in the suspension device typically includes the force from a spring for pressing the telescopic members outward. Typically the suspension device comprises at least one shock absorber, each shock absorber comprises a pair of telescopic members that are movable inward toward each other against a resisting force including smaller hydraulic damping and outward away from each other against a resisting force including substantially greater hydraulic damping, and the hydraulic force applying means comprises means for transmitting the hydraulic force to the telescopic members so as to oppose any inward movement thereof. The force resisting inward movement in each shock absorber typically includes also a compression spring for pressing the telescopic members outward.

Typically the force converting means comprises means for applying torque from friction braking of the front wheel to provide approximately linear movement, and means for applying the movement to provide hydraulic force. In the suspension device, typically one telescopic member has a cylindrical inner surface portion, the other telescopic member includes a rod having a solid portion with a side surface fitting snugly and slidably within the cylindrical inner surface portion to form a virtually fluid-tight chamber that decreases and increases in volume with inward and outward movement respectively of the telescopic members, and the hydraulic force applying means transmits the hydraulic force to the chamber, so as to oppose any decrease in its volume.

In typical embodiments of the invention the force converting means comprises means for applying torque from friction braking of the front wheel to provide approximately linear longitudinal movement to a piston having a solid portion with a side surface fitting snugly and slidably within a cylindrical inner surface portion of a fluid-containing member, positioned in substantially fixed relation to the axle of the front wheel, to form in the member a virtually fluid-tight chamber that decreases and increases in volume with movement of the piston caused by increasing and decreasing friction torque respectively, and the hydraulic force applying means includes means for transmitting hydraulic force from the chamber to the telescopic members so as to oppose any inward movement thereof.

DRAWINGS

CARRYING OUT THE INVENTION

Figure 4:
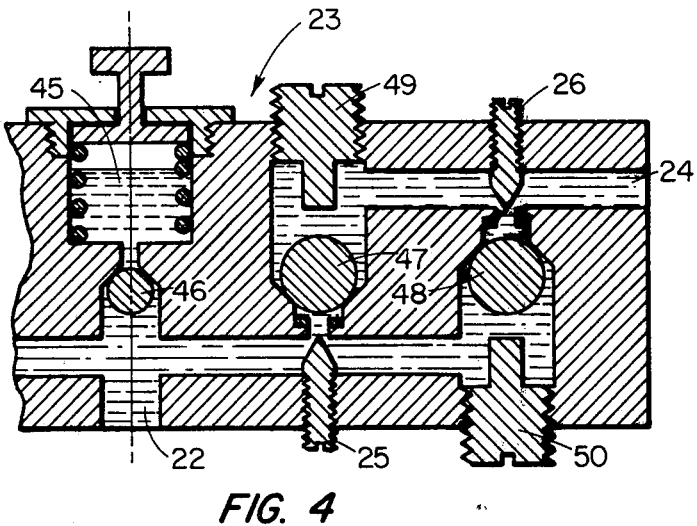
FIG. 4 is a front sectional view, with a repeated portion omitted, of the damping device 23 in the apparatus of FIGS. 1 and 2.
Figure 3:
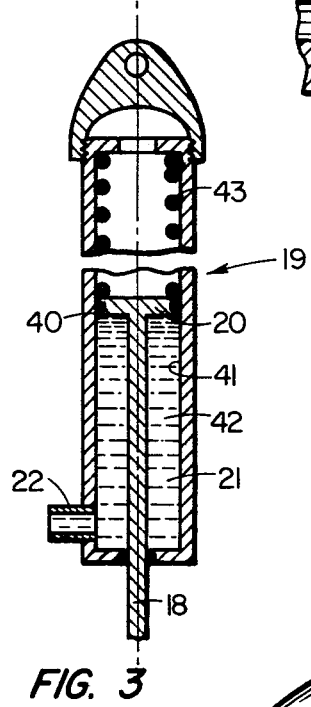
FIG. 3 is a side sectional view of the hydraulic cylinder 19 in the apparatus of FIGS. 1 and 2.
Figure 1:
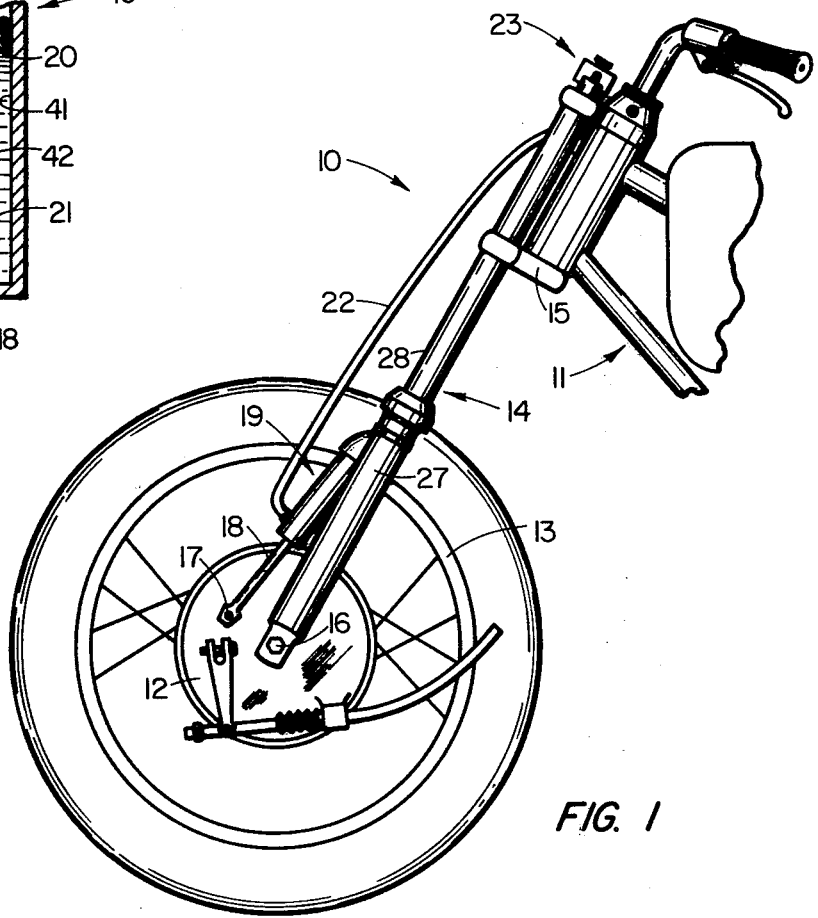
FIG. 1 is a side view of the front portion of a motorcycle or other similar vehicle including frontwheel suspension apparatus according to the present invention.

Referring first to FIG. 1, typical suspension apparatus 10 according to the present invention for the front end of a motorcycle, bicycle, or like vehicle 11, having a brake 12 on the front wheel 13, comprises a suspension device 14 comprising a pair of telescopic members 27,28 (FIG. 2) connected to permit relative movement between the frame 15 of the vehicle 11 and the axle 16 of the front wheel 13, a linkage 17,18,20 and a hydraulic cylinder 19 for converting friction force (at 17) from any substantial braking (at 12) of the front wheel 13 into an approximately proportional hydraulic force (at 21, FIG. 3) and fluid connecting lines 22,24 with adjustable damping means 23 (FIG. 4) for applying the hydraulic force from the fluid 21 to the suspension device 14, at an end surface 29 of a piston 35 therein, so as to oppose and at least largely counterbalance the inertial force thereto resulting from the braking action, and thus to at least largely eliminate diving by the front end of the vehicle 11 when the brake 12 is applied. The apparatus 10 typically is designed or adjusted to provide an opposing force that reduces diving substantially either to a tolerable level or to a negligible level. Alternatively, it can be made to eliminate diving entirely or even to over compensate, if desired.

The hydraulic force applying means 22–24 typically includes damping means 23 including a fluid reservoir 45 and check valves 46,47,48 for allowing the hydraulic force to increase gradually, when the brake 12 is applied, to the force that at least largely counterbalances the inertial force to the suspension device 14; and the damping means 23 typically includes means such as a pointed orifice size controlling screw 25 and an adjustable stop 49 in the check valve 47 for adjusting the rate of increase in the hydraulic force that is applied via the fluid conduits 22,24 to the suspension device 14 at the surface 29 of the piston 35. Typically the hydraulic force applying means 22–24 includes also in the damping means 23 provision for allowing the hydraulic force to decrease gradually, when the inertial force on the suspension device 14 decreases, (as when the brake 12 is released) to a lower force to at least largely eliminate upsurging by the front end of the vehicle 11; and this provision typically includes means such as a pointed orifice size controlling screw 26 and an adjustable stop 50 in the check valve 48 for adjusting the rate of decrease in the hydraulic force that is applied via the fluid conduits 22,24 to the suspension device 14 at the surface 29 of the piston 35.

The suspension device 14 typically comprises a pair of telescopic members 27,28 that are movable inward toward each other against a resisting force (including that of a compression spring 31 against the surface 30 on the piston 35) and outward away from each other against a resisting force (from the weight of the vehicle 11 and any other similarly acting external force), and the hydraulic force applying means 22–24 comprises means 24 for transmitting the hydraulic force (at 29) to the telescopic members 27,28 so as to oppose any inward movement thereof.

Typically the suspension device 14 comprises at least one shock absorber 14, each shock absorber 14 comprises a pair of telescopic members 27,28 that are movable inward toward each other against a resisting force (at 30 and 32) including smaller hydraulic damping (at 32, with the disk 33 in its uppermost position in the annular recess 32), and outward away from each other against a resisting force (at 32), including substantially greater hydraulic damping (with the disk 33 in its lowermost position in the annular recess 32), and the hydraulic force applying means 22–24 comprises means 24 for transmitting the hydraulic force (at 29) to the telescopic members 27,28 so as to press them outwardly, and thus to oppose any inward movement thereof. Typically each shock absorber 14 includes a compression spring 31 for pressing the telescopic members 27,28 outward. The annular recess 32 is formed by a hollow cylindrical member 52 that is attached to the lower end of the upper telescopic member 28, and a rod 53 that extends from (and is connected to) the piston 35 to the lower end of the lower telescopic member 27, to which it is there connected. A central passage 54 in the rod 53 provides a connection between the fluid 55 above the enlarged region 56 of the piston 35 (through the upper outlet 57) and fluid 55 below the region 56 (through the lower outlet 58), so that the suspension device 14 can function smoothly in its normal operation as a shock absorber as well as in its other operations.

Typically the force converting means 17–21 comprises a pivotable connection at 17 for applying torque from friction braking of the front wheel 13 to provide approximately linear movement to the piston linkage rod 18, and means including a piston end portion 20 for applying the movement to provide hydraulic force via the fluid 21, in the chamber 42 of the hydraulic cylinder 19, to the fluid conduit 22.

In the suspension device 14, typically the upper telescopic member 28 has a cylindrical inner surface portion 34, the lower telescopic member 27 includes a piston rod 35 connected thereto by the lower rod portion 53 and having a solid upper portion 29 with a side surface 36 fitting snugly and slidably within the cylindrical inner surface portion 34 to form a virtually fluid-tight chamber 37 that decreases and increases in volume with inward and outward movement respectively of the telescopic members 27,28, and the hydraulic force applying means 22–24 transmits the hydraulic force from the fluid 21 in the hydraulic cylinder 19, via the fluid conduit 22, the damping device 23, and the fluid conduit 24, to the chamber 37, so as to oppose any decrease in its volume.

In the apparatus 10 as shown in the drawings the force converting means 17–21 comprises the pivotable connecting means 17 for applying torque from friction braking of the front wheel 13 to provide approximately linear longitudinal movement to the piston 18 having a solid portion 20 with a side surface 40 fitting snugly and slidably within a cylindrical inner surface portion 41 of the fluid-containing member 19, positioned in substantially fixed relation to the axle 16 of the front wheel 13, to form in the member 19 a virtually fluid-tight chamber 42 that decreases and increases in volume with movement of the piston 18 caused by increasing and decreasing friction torque (at the brake 12) respectively, and the hydraulic force applying means 22–24 includes means 22 for transmitting hydraulic force from the chamber 42 (via the damping device 23 and the fluid conduit 24) to the chamber 37 formed by the telescopic members 27,28 so as to oppose any inward movement of the telescopic members 27,28. A spring 43 provides downward force against the solid end portion 20 of the piston 18 in the hydraulic cylinder 19 and counterbalances the hydraulic force in the fluid 21 to maintain the desired position of the piston 18 when there is no braking force thereto from the pivotable connection at 17 with the brake 12.

Figure 2:
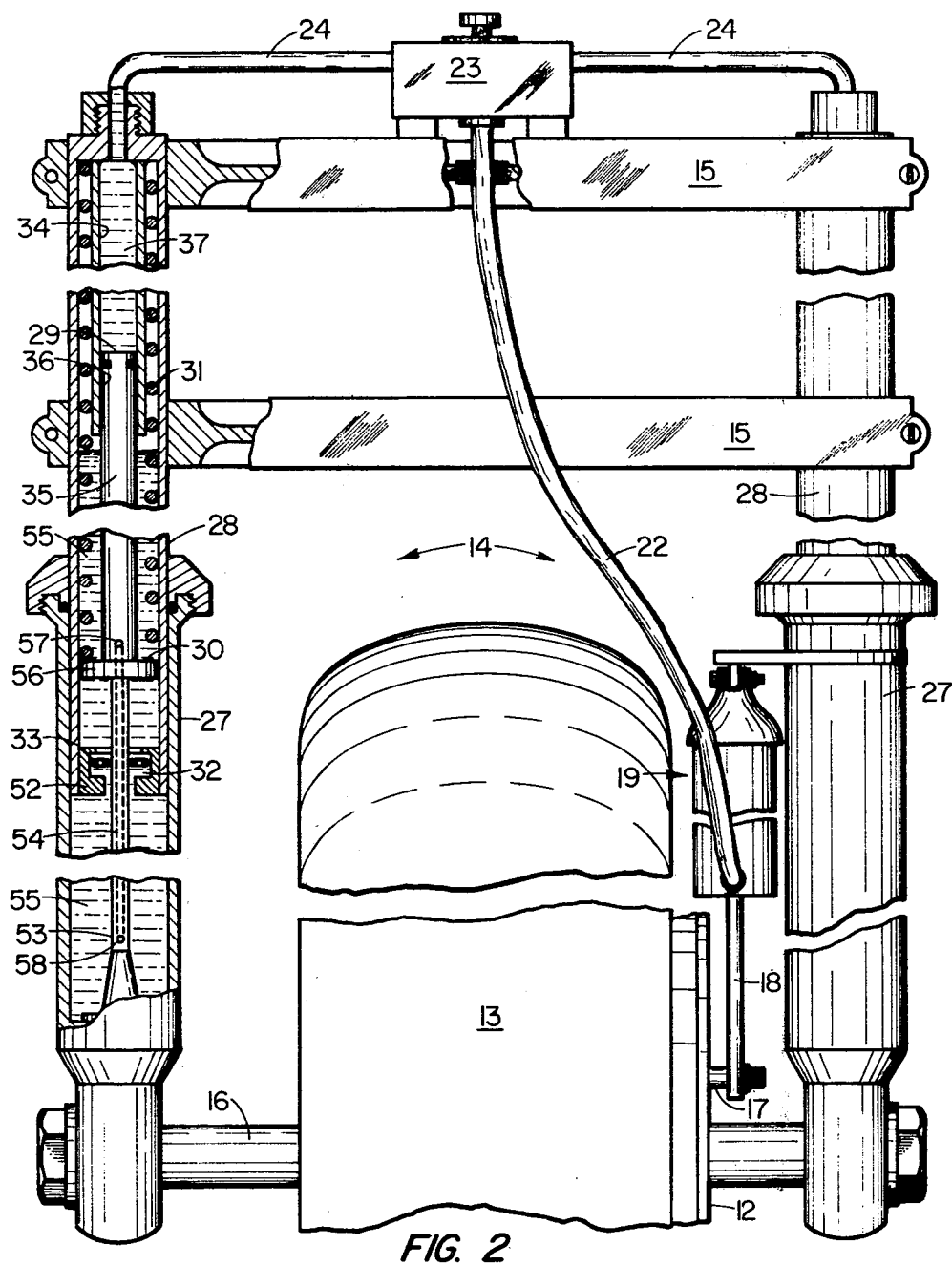
FIG. 2 is a front, partly sectional, view of a major portion of the suspension apparatus in FIG. 1.

Instead of applying the hydraulic force to a chamber inside the telescopic main suspension system as in FIG. 2, an additional hydraulic device can be connected to oppose collapsing of the suspension. For example, a rigid member can be attached to the lower telescopic members of an existing suspension; and a separate hydraulic cylinder can then be connected between the new member and the triple clamps of the fork assembly to receive the hydraulic force from the cylinder 19 and thus provide the antidive function.

While the forms of the invention herein disclosed constitute presently preferred embodiments, many others are possible. It is not intended herein to mention all of the possible equivalent forms or ramifications of the invention. The terms used herein are merely descriptive rather than limiting, and various changes may be made without departing from the spirit or scope of the invention.

APPLICABILITY

Antidive front suspensions first became available on American automobiles in the mid 1950's, and soon thereafter nearly all American cars were equipped with antidive. As antidive is now essentially universal, it receives little mention by the automobile manufacturers. Antidive is even more applicable to motorcycles because of their relatively short wheelbase and high center of gravity. Because motorcycle stability depends on the rotational inertia of a rolling front wheel, antidive has more effect on overall vehicle handling and comfort, especially under severe braking. If a motorcycle front wheel is locked, even for short periods of time, it is likely that an accident will result.

Motorcycle antidive has been used with some success in the past with leading link front suspensions. Such suspensions were known to provide good braking on rough surfaces; but the general handling dynamics was often a problem, due to a high moment of inertia about the steering head axis causing high speed wobble and lack of responsiveness. Also, low overall weight is difficult to obtain with leading link front suspensions. All of these problems are compounded by requirements for increased front wheel travel. So most motorcycle manufacturers have stopped using leading link front suspensions and presently use telescoping fork front suspensions. Many refinements have been made to the telescoping fork, such as air springs and long travel; but it still does not have the antidive feature.

The present invention provides a practical method of antidive front braking that is especially advantageous for motorcycles. It allows antidive braking to be incorporated with normal telescopic front forks. The degree of antidive and the dynamic response can easily be controlled to optimize performance. Furthermore, dynamic characteristics other than antidive (ride and handling) are not adversely altered. The invention can easily be incorporated and is very useful for all types of motorcycles, mopeds, bicycles, and like vehicles, especially vehicles having only one front wheel. Although it may be considered largely as a performance item, it is also inherently an effective safety device.

In typical embodiments, this invention applies a "spring stretching" force to the front suspension, compression type, springs of a motorcycle whenever the front brake is applied, thus reducing front end dive during braking and the resultant reduction of handling stability and control. The suspension apparatus automatically unloads the front springs in proportion to the amount of front braking force applied. This is done with a simple hydraulic ram placed inside each of the two front springs. The rams fit inside the springs and are powered by a hydraulic cylinder serving as the front brake torque reaction arm.

Under normal conditions the action of the front suspension is to cyclically collapse and extend the rams, thereby pushing and pulling the drive cylinder attached to the front brake. This has no effect on normal suspension action other than providing some additional damping. This can be compensated for by enlarging existing damping rod orifices in the front suspension.

When the front brakes are applied, a torque force proportional to deceleration, and thereby to dive angle, is applied to the torque reaction arm hydraulic cylinder. The hydraulic pressure product is delivered to the rams inside the front springs, resulting in a substantial reduction of dive angle.

The antidive action provided by the present invention eliminates two major motorcycle handling problems. First, if a large bump is encountered during heavy braking, there remains enough front suspension travel to absorb the impact. It is not uncommon for motorcycles to lose all suspension travel under relatively moderate braking. Second, handling geometry remains consistent during heavy braking since the normal attitude of the bike is maintained. In conventional suspensions, the weight transfer compresses the forks resulting in a pitching of the vehicle. This changes the steering head angle and amount of trail; which may have very adverse effects, especially when encountering bumps. As front suspension travel is increased, the magnitude of the problem increases; because of the greater possible pitch rotation. Two other advantages of the invention are that general riding comfort is increased by a reduction in pitching motion, and the headlight pattern remains constant rather than dipping. The suspension functions in the usual way under ordinary travel conditions as the spring rate and other normal characteristics are not affected by the antidive apparatus. The invention significantly increases safety and performance in both street and off-road motorcycles. It can also provide a competitive advantage to a motorcycle racing team, by allowing invention equipped riders to increase braking effectiveness and thereby total braking force of a vehicle under adverse competitive conditions, which reduces each braking time of a total lap time when compared with less forcefully braking vehicles.

With the present invention jounce travel may be nearly maintained, exactly maintained, or even increased, as preferred, without necessarily affecting the damping rates in the suspension.

We claim:

1. Suspension apparatus for the front end of a motorcycle, bicycle, or like vehicle, having a brake on the front wheel, comprising a suspension device connected to permit relative movement between the frame of the vehicle and the axle of the front wheel, means for converting friction force from any substantial braking of the front wheel into an approximately proportional hydraulic force, and means for applying the hydraulic force to the suspension device so as to oppose and at least largely counterbalance the inertial force thereto resulting from the braking action, and thus to at least largely eliminate diving by the front end of the vehicle when the brake is applied.

2. Apparatus as in claim 1, wherein the hydraulic force applying means includes damping means for allowing the hydraulic force to increase gradually, when the brake is applied, to the force that at least largely counterbalances the inertial force to the suspension device.

3. Apparatus as in claim 2, wherein the damping means includes means for adjusting the rate of increase in the hydraulic force that is applied to the suspension device.

4. Apparatus as in claim 2, wherein the hydraulic force applying means includes damping means for allowing the hydraulic force to decrease gradually, when the inertial force on the suspension device decreases, to a lower force to at least largely eliminate upsurging by the front end of the vehicle.

5. Apparatus as in claim 4, wherein the damping means includes means for adjusting the rate of decrease in the hydraulic force that is applied to the suspension device.

6. Apparatus as in claim 1, wherein the suspension device comprises a pair of telescopic members that are movable inward toward each other against a resisting force and outward away from each other against a resisting force, and the hydraulic force applying means comprises means for transmitting the hydraulic force to the telescopic members so as to oppose any inward movement thereof.

7. Apparatus as in claim 6, wherein the suspension device includes a spring for pressing the telescopic members outward, and the hydraulic force applying means transmits the hydraulic force to the telescopic members so as to press them outward.

8. Apparatus as in claim 1, wherein the suspension device comprises at least one shock absorber, and each shock absorber comprises a pair of telescopic members that are movable inward toward each other against a resisting force including smaller hydraulic damping and outward away from each other against a resisting force including substantially greater hydraulic damping, and the hydraulic force applying means transmits the hydraulic force to the telescopic members so as to oppose any inward movement thereof.

9. Apparatus as in claim 8, wherein each shock absorber includes a spring for pressing the telescopic members outward, and the hydraulic force applying means transmits the hydraulic force to the telescopic members so as to press them outward.

10. Apparatus as in claim 1, wherein the force converting means comprises means for applying torque from friction braking of the front wheel to provide approximately linear movement, and means for applying the movement to provide hydraulic force.

11. Apparatus as in claim 6, wherein one telescopic member has a cylindrical inner surface portion, the other telescopic member includes a rod having a solid portion with a side surface fitting snugly and slidably within the cylindrical inner surface portion to form a virtually fluid-tight chamber that decreases and increases in volume with inward and outward movement respectively of the telescopic members, and the hydraulic force applying means transmits the hydraulic force to the chamber, so as to oppose any decrease in its volume.

12. Apparatus as in claim 6, wherein the force converting means comprises means for applying torque from friction braking of the front wheel to provide approximately linear longitudinal movement to a piston having a solid portion with a side surface fitting snugly and slidably within a cylindrical inner surface portion of a fluid-containing member, positioned in substantially fixed relation to the axle of the front wheel, to form in the member a virtually fluid-tight chamber that decreases and increases in volume with movement of the piston caused by increasing and decreasing friction torque respectively, and the hydraulic force applying means includes means for transmitting hydraulic force from the chamber to the telescopic members so as to oppose any inward movement thereof.

* * * * *